H. G. & W. J. COLLINS.
HAY OR MANURE LOADING MACHINE.
APPLICATION FILED FEB. 1, 1909.
947,964.
Patented Feb. 1, 1910.
4 SHEETS—SHEET 3.
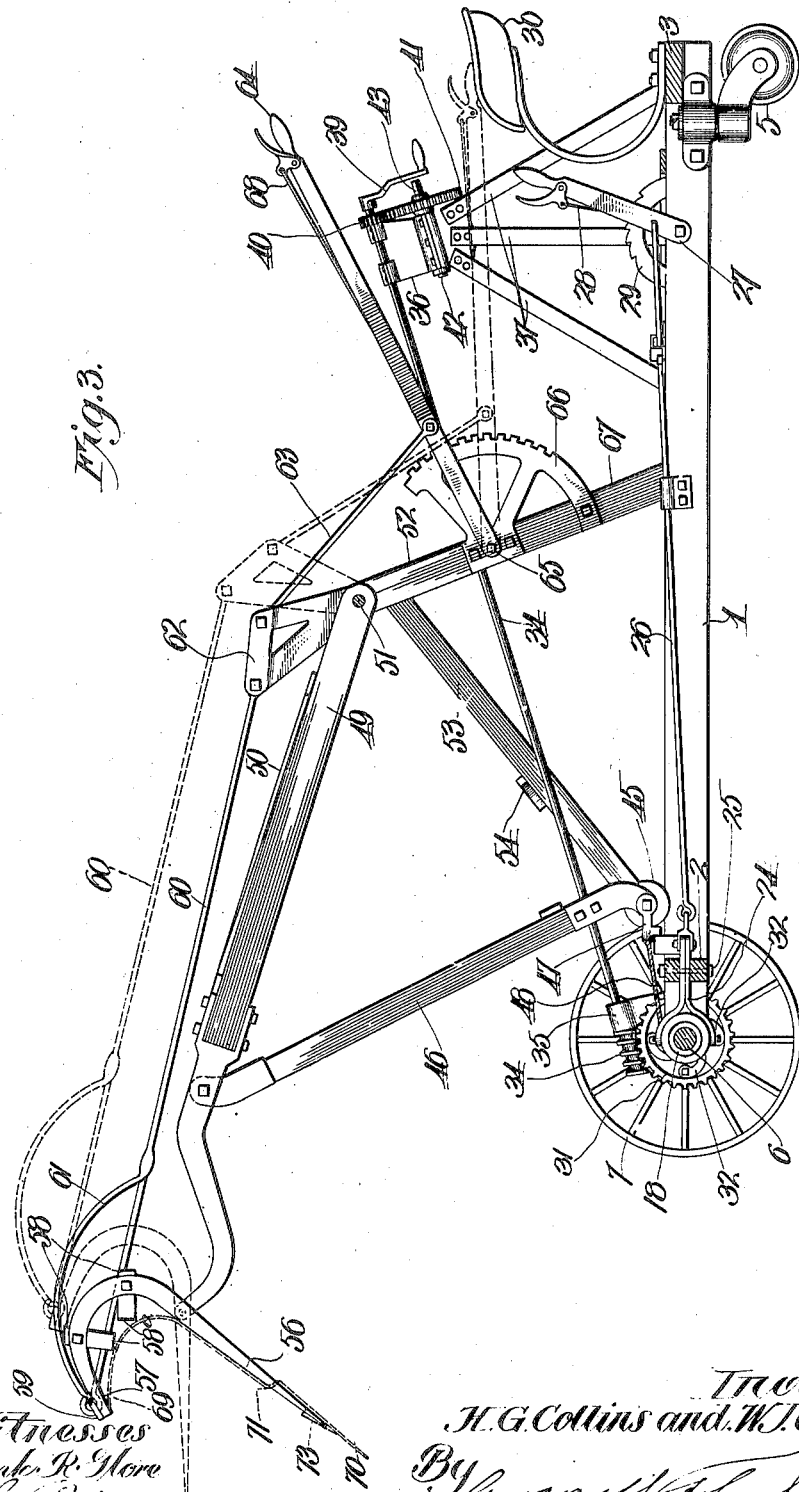

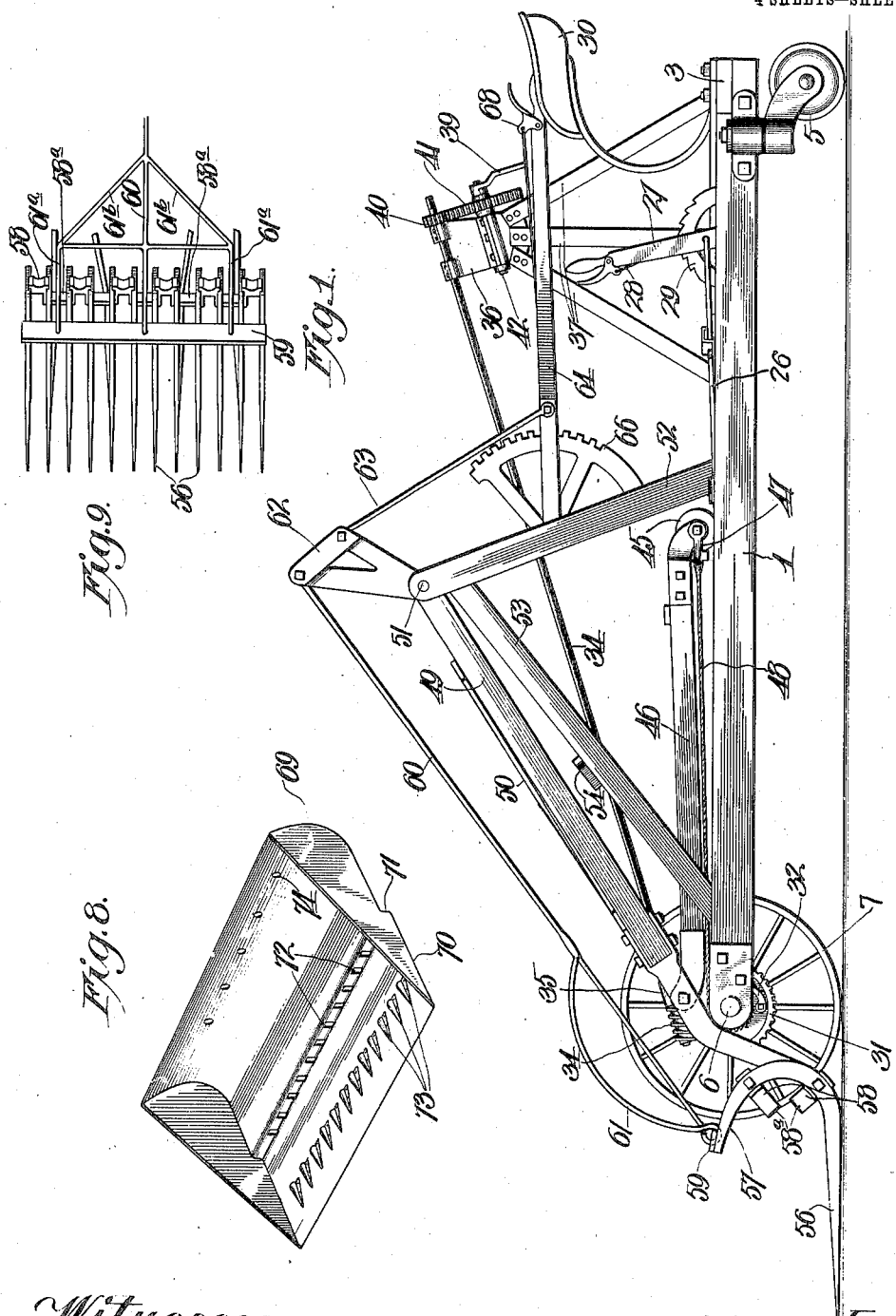

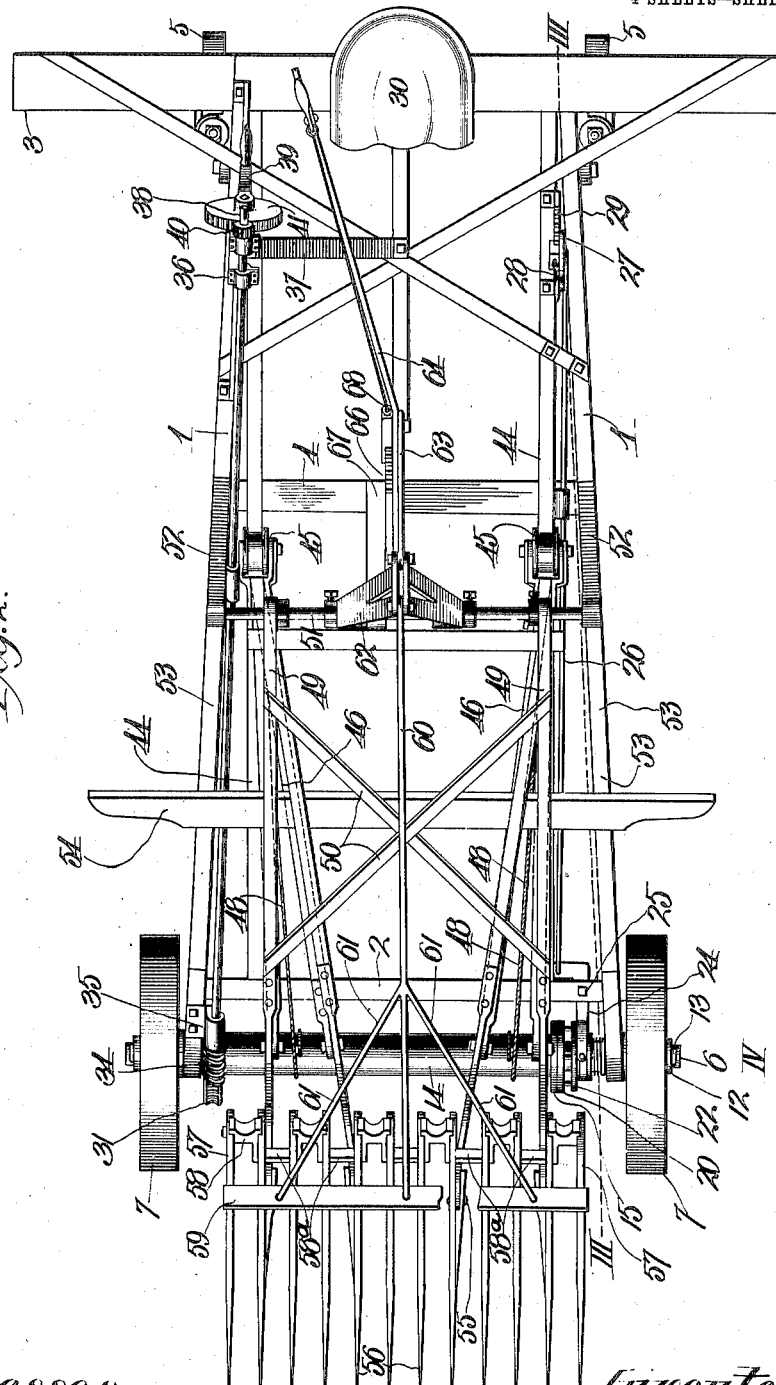

H. G. & W. J. COLLINS.
HAY OR MANURE LOADING MACHINE.
APPLICATION FILED FEB. 1, 1909.
947,964.
Patented Feb. 1, 1910.
4 SHEETS—SHEET 4.
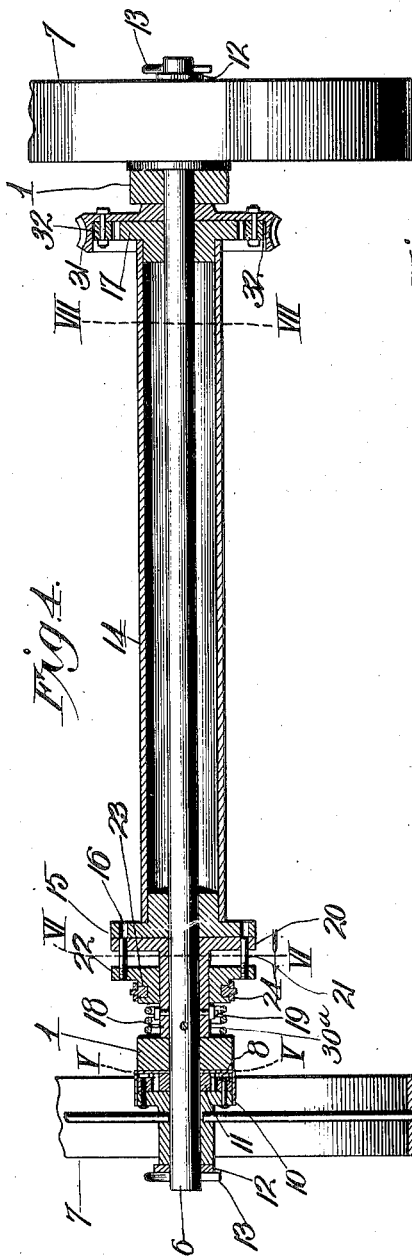
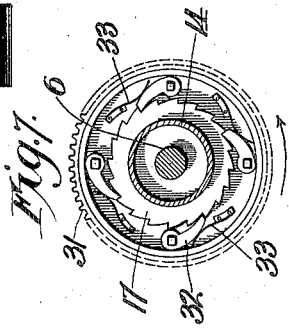
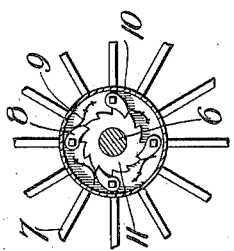
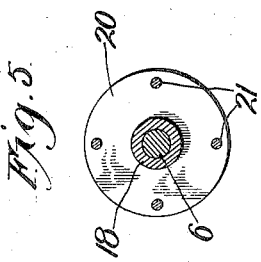
Witnesses
Frank R. Hoe
H. C. Rodgers
Inventors:
H. G. Collins and W. J. Collins.
By George H. Thorpe Atty.

UNITED STATES PATENT OFFICE.

HENRY G. COLLINS AND WILLIAM J. COLLINS, OF WILLIAMSBURG, KANSAS.

HAY OR MANURE LOADING MACHINE.

947,964.     Specification of Letters Patent.     Patented Feb. 1, 1910.

Application filed February 1, 1909. Serial No. 475,478.

*To all whom it may concern:*

Be it known that we, HENRY G. COLLINS and WILLIAM J. COLLINS, citizens of the United States, residing at Williamsburg, in the county of Franklin and State of Kansas, have invented certain new and useful Improvements in Hay or Manure Loading Machines, of which the following is a specification.

This invention relates to hay or manure loading machines and more especially to machines of that class for gathering up loose material, elevating the same and discharging it into a wagon or to form a stack, and the object of the invention is to produce a machine of the character outlined which will operate efficiently and reliably, and which can be controlled by a single person and is of comparatively simple, strong, durable and inexpensive construction.

With these objects in view the invention consists in certain novel and peculiar features of construction and organization as hereinafter described and claimed; and in order that it may be fully understood reference is to be had to the accompanying drawings, in which;

Figure 1, is a side elevation of a manure or hay loading machine embodying our invention. Fig. 2, is a top plan view of the machine. Fig. 3, is a vertical section taken on the line III—III of Fig. 2 but with the rake occupying its elevated position. Fig. 4, is an enlarged section taken on the dotted line IV of Fig. 2. Fig. 5, is a section taken on the dotted line V—V of Fig. 4. Fig. 6, is a section taken on the line VI—VI of Fig. 4. Fig. 7, is a section taken on the line VII—VII of Fig. 4. Fig. 8, is a perspective view of a scoop attachment for the rake. Fig. 9, is a plan view of a modified construction.

In the said drawings, a frame, hereinafter termed a wheeled frame, consists of a pair of side bars 1, and front, rear and intermediate bars 2, 3 and 4 respectively, connecting said side bars. Said frame is equipped at its rear end with a pair of caster-wheels 5, and at its front end forms a journal for a transverse shaft 6, and journaled on said shaft is a pair of carrying or traction wheels 7 having their hubs equipped at their inner ends with pivoted pawls 8 held pressed yieldingly inward by springs 9 secured to said hub and incased and thus protected from dust and dirt by cylindrical caps 10 rigid with ratchet-wheels 11 rigidly secured to shaft 6, the wheels 7 being maintained in operative relation to the ratchet-wheels by washers 12 and spring-cotters 13 or equivalent devices. By this arrangement it will be apparent that, as the wheels revolve in the usual way in the advance of the machine, the shaft 6 is turned but that the machine may be backed without reversing the movement of the shaft as the pawls will slip inoperatively over the teeth of ratchet-wheel 11.

14 is a drum provided at one end with a circular outwardly-projecting flange 15 equipped with a plurality of holes 16 and at the other end with a ratchet-toothed flange 17.

18 is a sleeve secured as at 19 or otherwise to shaft 6, and preventing endwise movement in one direction, of the drum 14, the end of the sleeve adjacent to the drum being equipped with a perforated flange 20 wherein fit slidingly pins 21 projecting from the collar 22 slidingly mounted on sleeve 18, and provided with a circular groove 23 receiving the forked end of a bell-crank lever 24 pivoted at 25 to cross-bar 2 and connected at the opposite side of its pivot from said slidable collar, by a pull-rod 26 with the lower end of a lever 27 fulcrumed on the wheeled frame and provided with a latch mechanism 28 for engagement with the notched-sector 29, said lever being within convenient reach of the driver who will occupy seat 30 carried by the wheeled frame.

To assist in causing the collar 22 to interlock with the drum and yieldingly resist unlocking of the collar from the drum, an expansive spring 30ª encircles sleeve 18 and bears at its opposite ends against the adjacent bar 1 and collar 22.

Journaled on the shaft 6 between the opposite end of the drum and the proximate bar 1 of the wheeled frame, is a worm-wheel 31, and pivotally carried by said wheel is a series of pawls 32 held by a corresponding series of springs 33 carried by said worm-wheel, in engagement with the ratchet toothed flange of drum 14, the arrangement being such that revolution of the worm-wheel, in the direction indicated by the adjacent arrow, Fig. 7, imparts movement in the same direction to the drum, for a purpose hereinafter explained, and in order to operate the worm-wheel it is engaged by a worm-shaft 34 journaled in bearing standards 35 and 36, the former being secured to the adjacent side bar 1 and the latter upon a series of standards 37 erected upon the wheeled frame, the rear end of shaft 34 being squared by preference as at 38 for engagement at times by a crank-handle 39, and secured upon said worm-shaft is a gear 40 meshing with a larger gear 41 rigidly secured on a short shaft 42 also journaled in bearing standard 36 and provided with a squared rear end 43 with which the handle 39 is adapted to be engaged at times.

44 indicates a pair of parallel tracks extending longitudinally of the wheeled frame and engaged by the flanged wheels 45 journaled in the bifurcated rear ends of a pair of lifting braces 46, the rear ends of said braces curving downward, by preference, to conveniently accommodate the clips 47 pivoted coincidently with wheels 45 and connected by cables 48 with the drum 14. The front ends of the lifting-braces 46 are pivotally connected to the front portions of a swing-frame, consisting of members 49 connected by cross braces 50, the rear or apex ends of the members 49 of the swing-frame being fulcrumed on a cross-rod 51 connecting the upper ends of the two members of a tower erected upon the wheeled-frame, each member of the tower preferably consisting of a pair of upwardly-converging bars 52 and 53 mounted upon the side bars of the wheeled frame, and bars 53 being connected by a transversely extending brace bar 54 which incidently performs the function of a neck-yoke center for the draft animals, which in practice, are stationed at opposite sides of the wheeled frame and hitched to and between said neck-yoke center bar and the rear bar 3, it being noticed in this connection that the lifting braces like members 49 of the swing-frame, are preferably of V-shape and equipped at their apex ends with the rollers 45.

Pivoted at 55 to the front ends of the swing-frame is a rake 56, the rear end of the same curving upwardly and forwardly to constitute a pocket 57, the teeth of the rake being rigidly connected by cross bars 58, as shown or otherwise. The cross bars are of tortuous form, that is they are provided with U-shaped portions 58$^a$ arranged to project into the hollow or pocket side of the rake for the purpose of avoiding conflict with certain parts hereinafter mentioned, when the rake or the scoop hereinafter referred to, performs its dumping function. The rear and upper ends of the teeth of the rake are connected by a cross bar 59 and pivoted to the same near its middle and in the vertical plane of one of the U-shaped or projecting portions 58$^a$ of cross bar 58 is a rod 60, a pair of oblique brace rods 61 for said rod being also connected at their front ends to bar 59 at opposite sides of and equal distances from its center to assist in maintaining it in proper position with relation to the supporting swing-frame but mainly to strengthen and stiffen the rod 60, as the same is operated as hereinafter explained, to impart vertical or dumping movement to the rake or scoop when elevated, it being noticed by reference to Figs. 1, 2 and 3 that the brace-rods 61 are arched in order to avoid conflict with cross bars 58 in the dumping action of the rake or scoop (see Fig. 3). In Fig. 9, a pair of rods 61$^a$ are disposed at opposite sides of rods 60 and said rods 61$^a$ are rigidly connected to rod 60 by brace-rods 61$^b$. In this construction the rods 61$^a$ and the brace rods 61$^b$ occupy the same plane as rod 60 as distinguished from the arched brace-rods 61, as the brace-rods 61$^a$ are in the vertical plane of two of the projecting U-shaped portions of cross-bar 58 and therefore will not interfere with the dumping operation of the rake or scoop. The rear end of said rod 60 is pivotally connected to a walking-beam 62 fulcrumed on shaft 51 and connected by link 63 with a lever 64 fulcrumed at 65 on and axially of a notched sector 66 secured to a brace 67 superimposed upon cross-bar 4 and engaging the cross-rod 51, the lever 64 having a latch mechanism 68 for engagement with the sector to lock the walking-beam in any desired position, it being noticed from the proportion and arrangement of the parts, that the swing-frame can be raised or lowered to elevate or depress the frame without varying the relation of the rake to the guard, that is to say if the rake is normally horizontal it will retain such position throughout the swinging movement of the swing-frame unless lever 64 is manipulated to impart dumping action to the rake.

In practice, as the machine is driven across the field, the rake gathers up the manure or other material until charged to the required extent. The driver then pushes lever 27 and through the instrumentality of the bell-crank 24, slides collar 22 inward until its pins 21 press against the adjacent end of the drum, said pins almost immediately registering with and entering the holes 16 of said drum and thus locking the same rigidly with the sleeve 18 rigidly secured to the shaft, so that said drum shall instantly begin to turn and thus wind the cables 48. By thus winding the cables upon the drum the roller-equipped ends of the lifting-braces 46 are pulled forward upon the tracks 44 and as a result said braces force the swing-frame upwardly, Fig. 3 indicating substantially the highest point which the swing-frame can attain. As the swing-frame attains the said position, the clip 47 carried by one of the braces 46, strikes and operates the bell-crank lever 24 and causes the same to withdraw the pins 21 from engagement with the perforations in the adjacent end of the drum 14, it being of course understood that the drum will not turn backward because prevented by the pawls 32 of the worm-wheel 31, it being obvious that the worm-wheel cannot turn backward because of its constant engagement with the worm-shaft, and thus serves to hold the swing-arms upward. With the arms elevated the machine is driven until its rake overhangs the wagon or other receptacle for the material elevated. The operator then grasps lever 64, trips the catch mechanism from engagement with the sector 66, and swings said lever, walking-beam and rake from the position shown in dotted to the position shown in full lines, Fig. 3, so that the material raised by the rake shall be discharged into the wagon or other receptacle which it overhangs. The rake is restored to its original position by reversing the manipulation of the lever 64.

Should the operator miscalculate his distance and because of this fact the swing-frame fail to attain its most elevated position as the machine is arrested, the lever 27 is manipulated to effect the disengagement of the pins 21 from the drum. The operator then slips crank-handle 39 on the squared end of the worm-shaft and manipulates said crank-handle and effects rotative action of the drum in the same direction so as to continue the elevation of the swing-frame and the rake. After elevating the material and dumping it from the rake and restoring the latter to its original position, the operator places the crank-handle on the squared end of shaft 42 and turns said handle in the proper direction to rotate the drum backward and thus pay out the cables which have been wound thereon and permit the swing-frame and rake to automatically gravitate back to their original positions.

For gathering and picking up dry, loose material which a rake or fork will not reliably sustain, I provide a scoop attachment of sheet-metal, the same consisting of a flat plate bent to form a curved rear portion 69 adapted to fit in and form a lining for the pocket portion of the rake, and a front portion 70 to underlie and project forward beyond the points of the rake teeth, the front and rear portions being united by a vertical shoulder 71 provided with openings 72 through which the teeth project so that forward of said shoulder the teeth overlie and rearward underlie the attachment, the latter being equipped at a suitable point with conical guards 73 to receive the points of the teeth. The rear portion of the attachment is also provided with holes 74 through which bolts not shown are adapted to be fitted and connected in any suitable manner to one or both of the cross-bars 58 to hold the scoop reliably in position, the rear end of the scoop preferably bearing against said cross bars or one of them. If desired the scoop may also be secured in any suitable manner to cross-bar 59.

From the above description it will be apparent that we have produced a loading machine embodying the features of advantage enumerated as desirable in the statement of the object of the invention and while we have described the preferred embodiment of the invention, we wish it to be understood that it is susceptible of modification in various particulars without departing from the spirit and scope or sacrificing any of the advantages of the appended claims.

Having thus described the invention what we claim as new and desire to secure by Letters-Patent, is:

1. A machine of the character described, comprising a frame wheel-supported at its rear end, a transverse shaft journaled in the front end of the frame, wheels journaled thereon, means whereby forward movement of the machine shall cause the rotating wheels to impart like movement to the shaft, a swing-frame suitably carried and adapted to swing in a vertical plane, a rake carried by the swing-frame, a winding-drum journaled on the shaft, a lifting-brace connected to said swing-frame and movable on the wheeled frame, a cable connecting the drum and said movable end of the lifting-brace, means for locking the drum rigid with the shaft, and means for automatically tripping the said locking means.

2. A machine of the character described, comprising a frame wheel-supported at its rear end, a transverse shaft journaled in the front end of the frame, wheels journaled thereon, means whereby forward movement of the machine shall cause the rotating wheels to impart like movement to the shaft, a swing-frame suitably carried and adapted to swing in a vertical plane, a rake carried by the swing-frame, a winding-drum journaled on the shaft, a lifting-brace connected to said swing-frame and movable on the wheeled frame, a cable connecting the drum and said movable end of the lifting-brace, means for locking the drum rigid with the shaft, and means for automatically tripping the said locking means.

3. A machine of the character described, comprising a frame wheel-supported at its rear end, a transverse shaft journaled in the front end of the frame, wheels journaled thereon, means whereby forward movement of the machine shall cause the rotating wheels to impart like movement to the shaft, a swing-frame suitably carried and adapted to swing in a vertical plane, a rake carried by the swing-frame, a winding-drum journaled on the shaft, a lifting-brace connected to said swing-frame and movable on the wheeled-frame, a cable connecting the drum and said movable end of the lifting-brace, means for locking the drum rigid with the shaft, means for automatically tripping the said locking means, a worm wheel journaled on said transverse shaft, a pawl and ratchet connection between said worm wheel and said winding drum, a worm shaft meshing with the worm wheel, a short shaft suitably supported, and a train of gear-wheels connecting said short shaft with said worm-shaft.

4. A machine of the character described, comprising a frame, wheel-supported at its rear end, a transverse shaft journaled in the front end of the frame, wheels journaled thereon, means whereby forward movement of the machine shall cause said wheels to impart like movement to said shaft, a tower upon the wheeled frame, a swing-frame fulcrumed on the tower, a brace pivoted at one end to the swing-frame and adapted at its other end to travel longitudinally of and upon the wheeled-frame, a winding-drum journaled on the shaft, a cable connecting the drum and the longitudinally-movable end of the brace, means for locking the drum rigid with the shaft, means for automatically tripping the said locking means, a rake pivoted to the swing-frame, a walking-beam mounted on the tower and linked to the rake eccentrically of its pivotal point, a lever suitably mounted, a link connecting the lever with the walking-beam, and means to secure the lever at any desired point in its adjustment.

5. A machine of the character described, comprising a frame wheel-supported at its rear end, a transverse shaft journaled in the front end of the frame, wheels journaled thereon, means whereby forward movement of the machine shall cause the rotating wheels to impart like movement to the shaft, a swing-frame suitably carried and adapted to swing in a vertical plane, a rake carried by the swing-frame, a winding-drum journaled on the shaft, a lifting-brace pivotally connected to said swing-frame and movable on the wheeled-frame, a cable connecting the drum and said movable end of the lifting-brace, means for locking the drum rigid with the shaft, a bell-crank lever connected to said locking-means, means movable with the traveling end of the brace, for operating said lever and causing the same to trip said locking means, and means for holding the winding drum stationary or turning it in either direction.

6. A machine of the character described, comprising a frame wheel-supported at its rear end, a transverse shaft journaled in the front end of the frame, wheels journaled thereon, means whereby forward movement of the machine shall cause the said wheels to impart like movement to the shaft, a tower, a swing-frame carried by the tower and adapted to operate in a vertical plane, a rake carried by the swing-frame, a winding-drum journaled on the shaft, a lifting-brace pivotally connected at its front end to the swing-frame, a roller journaled at the opposite end of said brace, a longitudinal track carried by the wheeled-frame, and engaged by said roller, a cable connecting the drum and the roller-equipped end of the lifting-brace, means for locking the drum rigid with the shaft, and means for tripping the said locking means.

7. A machine of the character described, comprising a frame wheel-supported at its rear end, a transverse shaft journaled in the front end of the frame, wheels journaled thereon, means whereby forward movement of the machine shall cause the said wheels to impart like movement to the shaft, a tower, a swing-frame carried by the tower and adapted to operate in a vertical plane, a rake carried by the swing-frame, a winding-drum journaled on the shaft, a lifting-brace pivotally connected at its front end to the swing-frame, a roller journaled at the opposite end of said brace, a longitudinal track carried by the wheeled-frame, and engaged by said roller, a cable connecting the drum and the roller-equipped end of the brace, means for locking the drum rigid with the shaft, a bell-crank lever mounted on the wheeled-frame and connected to the locking means, a spring to hold the drum and shaft yieldingly interlocked, and means movable with the lifting-brace for operating said bell-crank lever and causing the same to trip said locking means.

8. A machine of the character described, comprising a frame wheel-supported at its rear end, a transverse shaft journaled in the front end of the frame, wheels journaled thereon, means whereby forward movement of said wheels shall impart like rotation to said shaft, a drum journaled on the shaft and provided with perforations at one end, a sleeve rigid on the shaft, a collar slidingly mounted on the sleeve and provided with locking pins, a spring tending to slide said collar until its pins engage the perforations of the drum, a bell-crank lever mounted on the frame and connected to said collar, a lever mounted on the frame and linked to said bell-crank lever, a sector on the frame, a latch mechanism carried by the lever and adapted to engage the sector and lock the lever with the pins of the collar in or out of engagement with the perforations of the drum, a tower carried by the wheeled-frame, a swing-frame pivoted thereon, a rake pivotally carried by the swing-frame, a brace pivoted at its front end to the swing-frame and adapted to travel at its rear end on the wheeled-frame, a cable attached at its opposite ends to said drum and traveling end of the brace, and means for raising or lowering the rake independently of the swing-frame.

In testimony whereof we affix our signatures in the presence of two witnesses.

HENRY G. COLLINS.
WILLIAM J. COLLINS.

Witnesses:
M. J. FLAHERTY,
C. B. SURF.